United States Patent

[11] 3,587,189

| [72] | Inventor | Walter J. Kopicko, 110-B Martin Lane Wilmington, Del. |
|---|---|---|
| [21] | Appl. No. | 786,614 |
| [22] | Filed | Dec. 24, 1968 |
| [45] | Patented | June 28, 1971 |

[54] LIVE BAIT HOLDER
7 Claims, 6 Drawing Figs.

[52] U.S. Cl. .................................................. 43/44.4, 43/43.2, 43/44.8
[51] Int. Cl. ...................................................... A01k 83/06
[50] Field of Search ........................................... 43/44.4, 43.2

[56] References Cited
UNITED STATES PATENTS

| 2,150,874 | 3/1939 | Wagner | 43/44.4 |
| 2,463,369 | 3/1949 | Finlay et al. | 43/44.4 |
| 2,522,073 | 9/1950 | Trada | 43/44.4 |
| 2,765,574 | 10/1956 | Martin | 43/44.4 |

*Primary Examiner*—Samuel Koren
*Assistant Examiner*—Daniel J. Leach
*Attorney*—Robert Collat ABSTRACT: A live bait holder attachable to a fishhook comprises a clamp member having divergent flexible legs of resilient material extending through openings in a support member between which bait is held without being pierced or squeezed unduly. Engagement of the legs with the support member holds the clamp member in open position for loading of bait. Slight pressure on the clamp member causes it to be snap closed. The springlike action of the divergent legs biases the clamp member toward the support member in closed position to retain bait in the holder.

INVENTOR

Walter J. Kopicko

PATENTED JUN 28 1971

INVENTOR

Walter J. Kopiske

LIVE BAIT HOLDER

BACKGROUND OF THE INVENTION

This invention relates to live bait holders for fishhooks. More particularly, it relates to a live bait holder for fishhooks which retains the bait adjacent the hooked portion of the hook without the necessity of piercing the bait with the hooked portion.

The known live bait holders for fishhooks include those that require the bait to be pierced by the hooked portion or by other gripping means that generally pierce and kill the bait in a short period of time. Other known constructions include spiral cages and wire loops that do not kill the live bait once it is properly positioned but require one or both hands of the fisherman to retain the device in open position while placing the live bait therein.

SUMMARY OF THE INVENTION

The live bait holder of this invention comprises a support member adapted for attachment to a fishhook and a clamp member cooperative therewith and movable between an open bait-loading position remote from said support member and a closed clamping position near said support member for securely holding bait therebetween, said clamp member having divergent flexible legs of resilient material extending to and through said support member, whereby engagement of said legs with said support member releasably retains said clamp member in said open position and biases said clamp member toward said support member in said closed position.

The live bait holder of this invention may be permanently attached to a fishhook. It retains the live bait properly positioned adjacent the hooked portion of the fishhook for an indefinite period of time but does not pierce or squeeze the bait such that it dies. This invention also provides a live bait holder that can be set in open position for reception of bait and that will remain automatically in this position without need of external force or pressure until it is desired to move the clamp to the closed position, whereupon the bait though securely retained can swim freely in a natural manner. The clamping pressure in the bait holder of this invention is easily regulated, as more fully described hereinafter.

DETAILED DESCRIPTION

Figure 1:
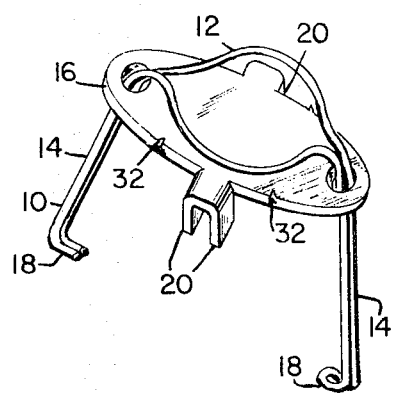
FIG. 1 is a perspective view of a live bait holder of this invention.

The live bait holder of this invention illustrated in the drawings includes a clamp member 10, preferably formed of tempered spring wire. Clamp member 10 includes a pair of divergent legs 14 that extend from clamping portion 12 to and through openings in support member 16. Legs 14 terminate in inwardly turned end portions 18.

Figure 2:
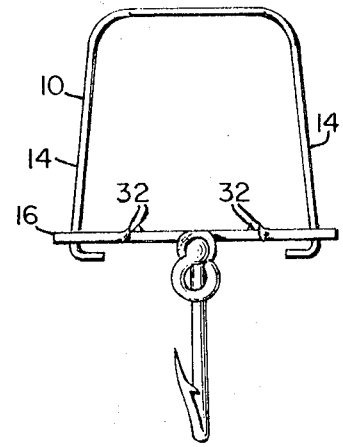
FIG. 2 is a front view of the embodiment of FIG. 1 mounted on a fishhook and in open bait-loading position.
Figure 3:
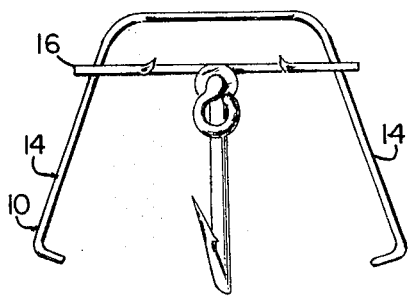
FIG. 3 is the corresponding view in closed position.
Figure 4:
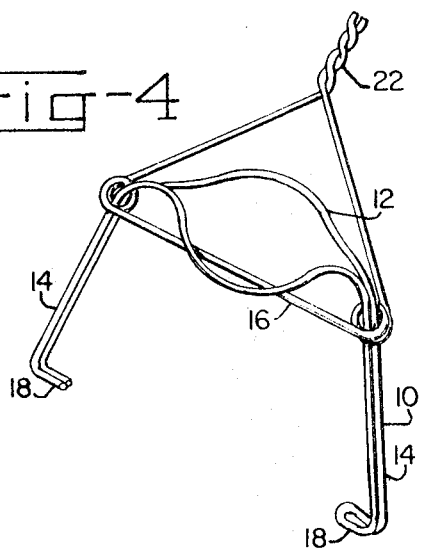
FIG. 4 is a perspective view of another embodiment of the invention having an alternate support member.
Figure 6:
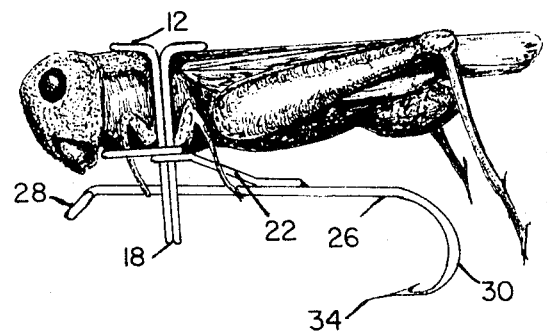
FIG. 6 is a side view of a fishhook equipped with the embodiment of FIG. 4, holding a grasshopper in place.

In FIGS. 1 through 3, support member 16 is a flat metal plate provided with small holes through which pass legs 14 of the clamp member and further provided with prongs 20 whereby support member 16 may be clamped to the shank of an ordinary fishhook, as shown in FIGS. 2 and 3. In FIG. 4, support member 16 is a wire loop the ends of which are twisted together at 22 to form means for attachment to the shank of a fishhook, as shown in FIG. 6. The wire loop in FIG. 4 is coiled at two locations to form eyelets through which pass legs 14 of the clamp member.

The support member 16 is attached to the shank of the fishhook in any suitable way, such as by soldering, brazing, welding, clamping, riveting, and the like. Instead of being separately formed and attached to the fishhook, the support member may be made integral with the shank of the hook.

Figure 5:
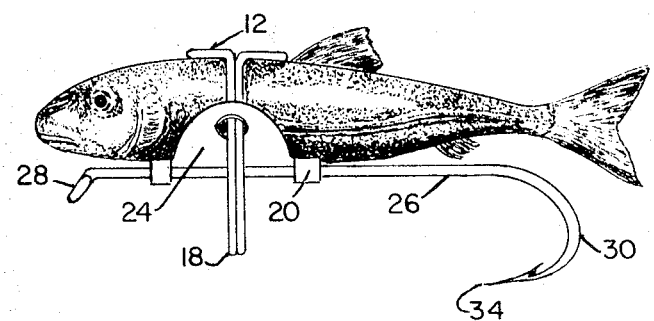
FIG. 5 is a side view of a fishhook equipped with a preferred embodiment of the invention, holding a minnow in place.

The support member 16 is shown in FIGS. 1 through 4 as being planar or flat, but it is not necessary that it be flat. The support member may be curved to the shape of a minnow, as illustrated in FIG. 5, or it may be V-shaped or semicircular, as appropriate. If flat, then the legs 14 of clamp member 10 extend through it in a plane generally perpendicular to that of the support member.

In assembling the bait holder, I prefer to form a length of spring wire to the desired configuration of the clamp member 10 including the divergent legs 14 by methods well-known in the art of shaping spring clips. The free ends of the wire may be united, such as by brazing or soldering, to form a continuous loop. The legs are then inserted through the openings in the support member, and the end portions of the legs are bent or provided with stop means, such as a large drop of solder, to prevent the legs from being unintentionally withdrawn from the support member.

To load the bait holder, the clamp member is moved to the open position shown in FIG. 2 by merely pressing the end portions of legs 14 slightly together while pushing said end portions upward toward support member 16. As the end portions of the legs approach the support member, the springlike action of the legs against the edge of the openings in the support member holds the clamp member in the open position, even though the fisherman exerts no further pressure on the clamp member. At the same time, the legs become more nearly parallel to each other. Live bait may then be inserted in the space between the clamp and support members, and thereafter the clamp member is easily moved to the closed position for securing the bait in the holder. This is most conveniently accomplished by slight downward pressure on clamping portion 12. As the end portions of the legs move away from the support member, the legs become less parallel to each other, and the increasing divergence biases the clamp member toward the support member, causing it to be snap closed and thereby providing a gentle but firm clamping pressure for securely holding the bait in the device, as shown in FIGS. 5 an 6.

For best results, the shape and type of support member 16 is selected according to the nature of the bait and the conditions of use. When rough handling of bait is anticipated, such as during surf casting or trolling, I prefer to use a metal plate as support member. Most preferably with minnows, the metal plate is in the shape of an upwardly or concavely curved, oval disc 24, shown in FIG. 5 attached to the shank 26 of a fishhook between the eye 28 and the arcuate hooked portion 30. Alternatively, the disc may be made of rubber and may be attached to the hook by one or more openings through which the shank passes. The metal disc has the further advantage of acting as a lure. With crickets, grasshoppers, small animals, or small shellfish, I prefer to use a wire loop 16, shown in FIGS. 4 and 6, as support member.

The device of this invention is capable of variation and modification as desired. For example, though I prefer to clamp the bait generally parallel to the shank of the hook and on the opposite side from the barb, the support member may be attached to the shank so as to hold the bait diagonally or transversely to the shank and at any angle to the barb, as desired. Moreover, the support member may be provided with a plurality of oppositely directed, very small teeth or barbs 32, approximately one sixty-fourth inch in length, for engaging particularly slippery bait but without causing substantial penetration thereof. Such small teeth may also be provided on the clamp member, such as at the junction of the legs 14 with the clamping portion 12. I prefer to use a bait holder in which at least one of the clamp and support members is provided with said small teeth. When the curved disc is used as support member, it is preferable for it to be provided with said small teeth.

It is not necessary that the elements of the clamp member be separated in the region of the clamping portion, as illustrated in the drawings at 12, but such arrangement is preferred inasmuch as it provides increased clamping area. In the closed position, primary clamping contact is provided by this portion. Legs 14 primarily provide the biasing force to hold the clamp and support members together while also providing some lateral clamping action. The end portions 18 of the legs may alternatively be bent outwardly or in other directions, as desired, but the inwardly bent orientation is preferred, since it then has the additional advantage of providing a weedless hook by serving to deflect the barb 34 from engagement with underwater obstacles during trolling or casting.

Clamping pressure is easily regulated by adjustment of the angle at which legs 14 diverge in the closed position. Spreading of the legs so as to increase the angle will increase clamping pressure. Conversely, decreasing the angle between the legs will decrease clamping pressure.

Although the live bait holder of this invention is illustrated and described in combination with a particular type of fishhook, it should be understood that this invention may be used in combination with various other types of hooks and provides a simple yet effective means of attaching live bait of various kinds securely to a fishhook in a natural position so that the bait may wiggle, swim, move legs, wings, or other body parts, etc. in a natural manner.

I claim:

1. A bait holder comprising a support member adapted for attachment to a fishhook and a clam member cooperative therewith and movable between an open bait-loading position remote from said support member and a closed clamping position near said support member for securely holding bait therebetween, said clamp member having a clamping portion and flexible legs of resilient material extending divergently from the clamping portion of said member to and through openings in said support member and adapted to exert spreading pressure against the edges of said openings, said legs diverging at a relatively small angle in said open position to releasably retain said clamp member in said open position and diverging at a relatively large angle in said closed position to bias said clamp member toward said support member in said closed position, the end portions of said legs having stop means shaped to prevent withdrawal from said support member during use.

2. The bait holder of claim 1 wherein the support member comprises a plate.

3. The bait holder of claim 1 wherein the support member comprises a wire loop provided with eyelets.

4. The bait holder of claim 1 wherein the legs of the clamp member terminate in inwardly turned end portions to provide said shaped stop means.

5. The bait holder of claim 1 in combination with a fishhook having an eye, a shank, and an arcuate hooked portion terminating in a barb, wherein the support member is attached to the shank of said fishhook intermediate said eye and said arcuate hooked portion and on the opposite side from said barb.

6. The bait holder of claim 1 wherein the legs of said clamp member are free of protuberances along their length intermediate the ends thereof whereby slight pressure on the clamp member in open position causes it to be snap closed.

7. The bait holder of claim 2 wherein the legs of said clamp member are in a plane essentially perpendicular to the plane of said plate.

UNITED STATES PATENT OFFICE
CERTIFICATE OF CORRECTION

Patent No. 3,587,189     Dated June 28, 1971

Inventor(s) Walter J. Kopicko

It is certified that error appears in the above-identified patent and that said Letters Patent are hereby corrected as shown below:

Column 2, line 44, "an" should read -- and --.
Column 3, line 29, "clam" should read -- clamp --.

Signed and sealed this 25th day of July 1972.

(SEAL)
Attest:

EDWARD M. FLETCHER, JR.　　　　　　ROBERT GOTTSCHALK
Attesting Officer　　　　　　　　　Commissioner of Patents